UNITED STATES PATENT OFFICE.

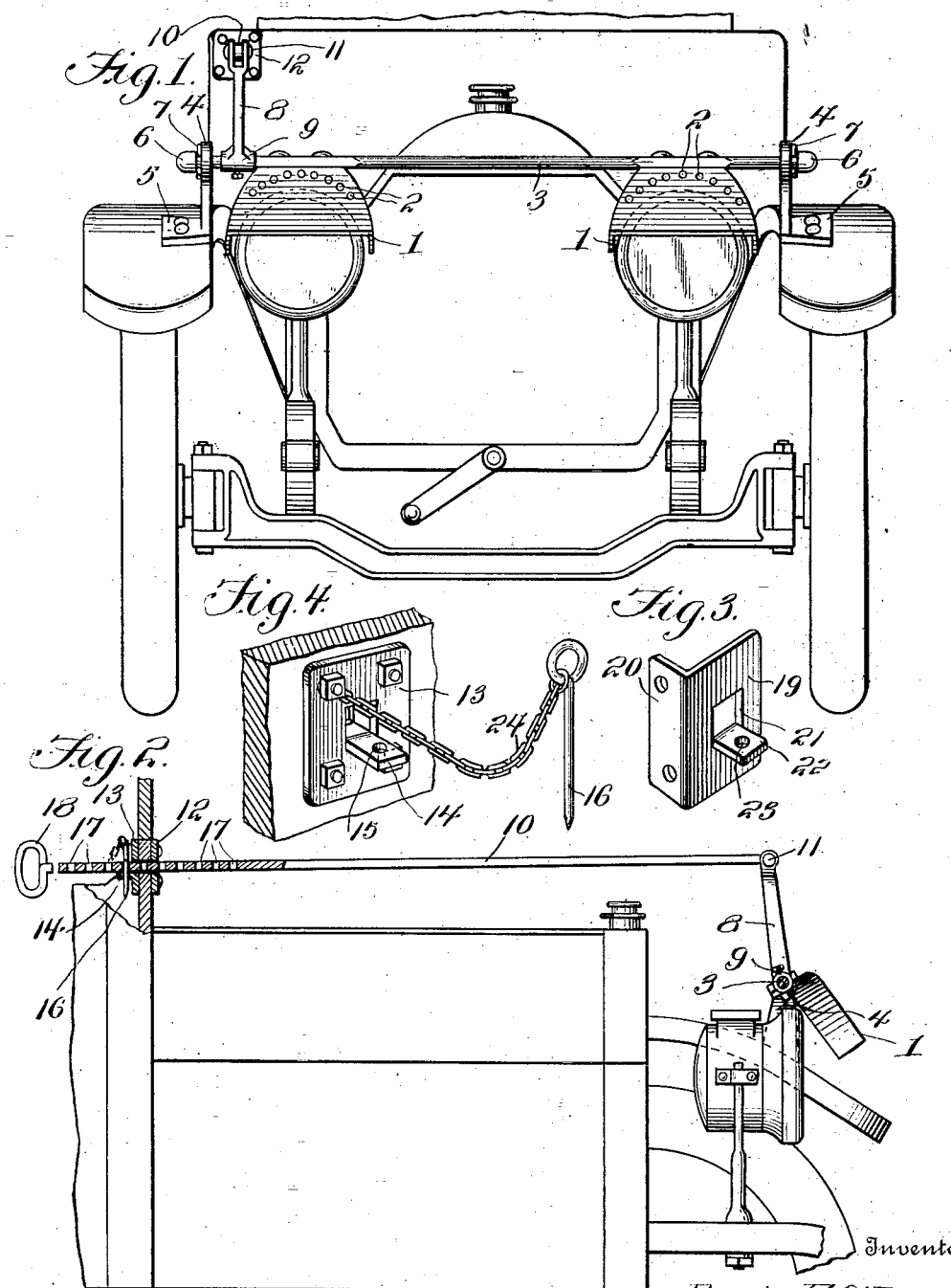

DAVID F. O'DONNELL, OF MASON CITY, IOWA.

HEAD-LAMP SHADE FOR MOTOR-VEHICLES.

1,177,535.  Specification of Letters Patent. Patented Mar. 28, 1916.

Application filed July 7, 1914. Serial No. 849,534.

*To all whom it may concern:*

Be it known that I, DAVID F. O'DONNELL, a citizen of the United States, residing at Mason City, in the county of Cerro Gordo and State of Iowa, have invented new and useful Improvements in Head-Lamp Shades for Motor-Vehicles, of which the following is a specification.

This invention relates to headlamp shades for automobiles and other motor vehicles, the object in view being to provide simple means whereby the headlamps may be partially shaded or screened so as to avoid the objectionable glare of the headlights on vehicles and pedestrians in front of the machine equipped with such headlamps, thereby greatly facilitating traveling by motor at night.

A further object of the invention is to provide a device of the class described which is adjustable or shiftable so that the full light from the lamps may be obtained when traveling in the open country, combined with means for adjusting the throw of the shade and also for locking the same in any predetermined position.

With the above and other objects in view, the invention consists in the novel construction, combination and arrangement of parts, as herein described, illustrated and claimed.

In the accompanying drawings:—Figure 1 is a front elevation showing a sufficient part of a motor vehicle to illustrate the application of the present invention thereto. Fig. 2 is a vertical longitudinal section taken in line with the operating rod and pin. Fig. 3 is a detail perspective view of the L-shaped guide and keeper. Fig. 4 is a fragmentary perspective view showing the keeper plate and adjacent parts.

As there are usually two headlamps on each automobile or other motor vehicle, I provide two lamp shades 1 each of which is of suitable size and shape to shield or cover the upper portion of the headlamp so as to cut off the rays of light with the exception of those that illuminate the road way for a certain distance in front of the machine.

The shades 1 are preferably provided with perforations 2 adjacent to the upper edge thereof to prevent accumulation of dust behind said shades and on the lenses of the lamps and in the preferred embodiment of the invention, both of the shades 1 are fixedly attached to a rock shaft 3 which is journaled in brackets 4 shown as provided with attaching flanges 5 by means of which they are fastened to the front fenders of the machine as illustrated in Figs. 1 and 2. The brackets 4 will of course be of sufficient height to enable the rock shaft 3 to clear the hood and radiator of the machine and not interfere with cranking the engine, the height of the brackets 4 varying in accordance with the machine on which the invention is mounted.

The shaft 3 may be either in one piece or of sectional construction and may be provided either with end caps or collars 6 or keys or cotter pins 7 or both of said devices, to prevent longitudinal or end play of the shaft 3.

Extending perpendicularly to the shaft 3 is a lever arm 8 which is preferably connected to a collar 9 which may be adjusted by a set screw to any desired point in the length of the shaft 3, the arm 8 in some cases being arranged centrally between the lamps and in other cases being arranged adjacent to one end of the shaft so as to receive the operating rod 10 which is pivotally connected at 11 to the extremity of the arm 8. The operating rod 10 passes through a guide plate 12 on the dash of the machine or the base of the wind shield and also through a keeper plate 13 secured to the rear side of said dash or wind shield, the plate 13 being provided with a projecting lip 14 provided with a hole 15 to receive a locking pin 16 which is insertible through any one of a longitudinal series of holes 17 in the operating rod 10. The rod 10 is provided at its rear extremity with a suitable handle 18 which may be of any desired shape.

In case the operating rod 10 is arranged to one side of the machine, I prefer to employ a combined guide and keeper shown in detail in Fig. 3 and designated at 19, said keeper plate being substantially L-shaped so as to provide an attaching flange 20 which may be secured to any convenient part of the machine where the handle of the operating rod will be arranged in convenient position to be grasped by the operator. The plate 19 is formed with the guide opening 21 for the operating rod and a projecting lip 22 formed with a hole 23 to receive the pin hereinabove referred to. The locking pin is shown as connected to the machine by means of an anchoring chain 24 to prevent loss thereof.

From the foregoing description it will now be seen that by sliding the rod 10 in a forward or rearward direction, the shaft 3 may be turned so as to throw the shades 1 to their obstructing or non-obstructing position for the purpose above stated. By inserting the locking pin through the proper hole in the operating rod 10, the movement of the shaft 3 may be limited so as to stop the shades 1 at a predetermined point and of inserting said pin also through the hole in the keeper lip, the rod 10 may be locked against longitudinal movement so as to sustain the shades in a fixed position.

What I claim is:—

The combination with a motor vehicle, and the head lamps thereof, of a horizontal rock shaft journaled in bearings above the head lamps on the vehicle itself and independently of said head lamps, substantially semi-circular lampshades fastened to said rock shaft, depending therefrom, and having rearwardly extending marginal flanges and also formed with vent openings adjacent to the upper margin thereof, a perforated rod operable by the driver while in his seat for rocking said shaft and moving said shades to light obstructing and non-obstructing position, and means for locking said shades at various angles including a perforated keeper on the vehicle dash, and a pin insertible through said keeper and perforated rod.

In testimony whereof I affix my signature in presence of two witnesses.

DAVID F. O'DONNELL.

Witnesses:
FRANK WALLENHURST,
HARRY E. LUTZ.